US007596080B2

(12) United States Patent
Gerlach

(10) Patent No.: US 7,596,080 B2
(45) Date of Patent: Sep. 29, 2009

(54) METHOD FOR DISTRIBUTING DATA ON AN OFDM TIME-FREQUENCY GRID ALLOWING FOR COORDINATION OF INTERFERENCES AND ADAPTIVE SUBCARRIER FREQUENCY ALLOCATION, A BASE TRANSCEIVER STATION, A BASE STATION CONTROLLER AND A MOBILE NETWORK THEREFOR

(75) Inventor: Christian Georg Gerlach, Ditzingen (DE)

(73) Assignee: Alcatel Lucent, Paris (FR)

( * ) Notice: Subject to any disclaimer, the term of this patent is extended or adjusted under 35 U.S.C. 154(b) by 588 days.

(21) Appl. No.: 11/356,370

(22) Filed: Feb. 17, 2006

(65) Prior Publication Data
US 2006/0198295 A1 Sep. 7, 2006

(30) Foreign Application Priority Data
Mar. 1, 2005 (EP) .................................. 05290462

(51) Int. Cl.
*H04J 11/00* (2006.01)
(52) U.S. Cl. ..................... 370/203; 375/259; 375/260
(58) Field of Classification Search ................. 370/203, 370/208, 310, 328, 464, 465; 375/314, 345, 375/347, 259, 260, 284–285, 295–296; 455/403, 455/422.1, 450
See application file for complete search history.

(56) References Cited
U.S. PATENT DOCUMENTS

2002/0147017 A1 10/2002 Li et al.
2003/0103445 A1* 6/2003 Steer et al. ................. 370/208
2003/0169681 A1* 9/2003 Li et al. ..................... 370/203
2004/0001429 A1 1/2004 Ma et al.
2004/0190640 A1 9/2004 Dubuc et al.
2007/0133386 A1* 6/2007 Kim et al. .................. 370/203

FOREIGN PATENT DOCUMENTS

EP 1 526 374 A 4/2005

OTHER PUBLICATIONS

3GPP: "OFDM With Interference Control for Improved HSDPA Coverage," 3GPP TSG RAN WGI Meeting #37, May 2004, pp. 1-11, XP002310556.
European Telecommunications Standards Institute, ETSI: "3$^{rd}$ Generation Partnership Project; Technical Specification Group Radio Access Network; Feasability Study for Orthogonal Frequency Division Multiplexing (OFDM) for UTRAN enhancement (Release 6)" 3GPP TR 25.892 V6.0.0, Jun. 1, 2004, XP002336544.
Filed Feb. 17, 2006, entitled, "A Method for Distributing Data on an OFDM Time-Frequency Grid, a Base Tranceiver Station, a Base Station Controller and a Mobile Network Therefor."

* cited by examiner

*Primary Examiner*—William Trost, IV
*Assistant Examiner*—Charles C Jiang
(74) *Attorney, Agent, or Firm*—Fay Sharpe LLP

(57) ABSTRACT

The invention concerns a method for distributing data on an OFDM time-frequency grid for data transmission from and to mobile terminals in a mobile network allowing for coordination of interferences between different cells of the mobile network and adaptive subcarrier frequency allocation to mobile terminals, whereby subcarrier frequencies of the OFDM time-frequency grid are gathered in frequency patterns, the frequency patterns are constructed to accommodate the use of pilot subgrids, a set of frequency patterns is changed in a pilot compatible manner between frequency diverse and frequency selective frequency patterns, and said frequency patterns are allocated to mobile terminals for data transmission , a base transceiver station, a base station controller and a mobile network therefor.

7 Claims, 3 Drawing Sheets

US 7,596,080 B2

Figure 1:
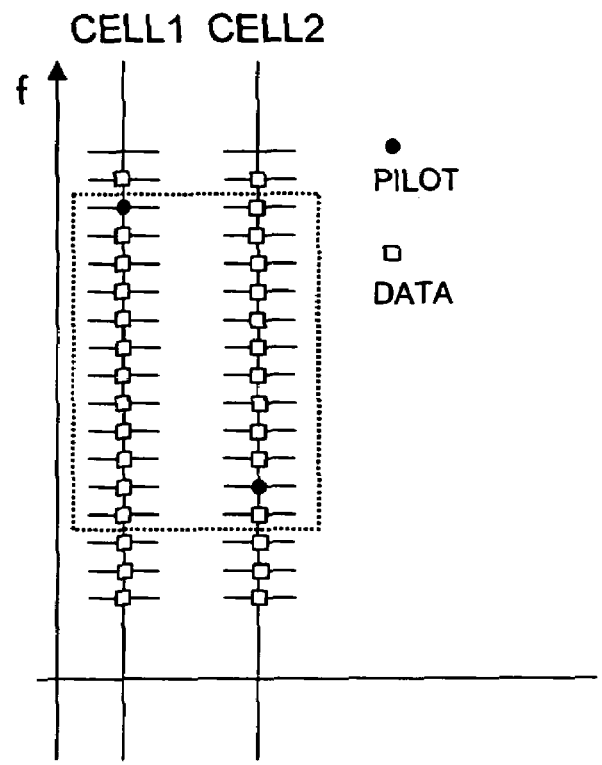

METHOD FOR DISTRIBUTING DATA ON AN OFDM TIME-FREQUENCY GRID ALLOWING FOR COORDINATION OF INTERFERENCES AND ADAPTIVE SUBCARRIER FREQUENCY ALLOCATION, A BASE TRANSCEIVER STATION, A BASE STATION CONTROLLER AND A MOBILE NETWORK THEREFOR

The invention is based on a priority application EP 05290462.0 which is hereby incorporated by reference.

FIELD OF THE INVENTION

The invention relates to a method for distributing data on an OFDM (OFDM=Orthogonal Frequency Division Multiplexing) time-frequency grid allowing for coordination of interferences and adaptive subcarrier frequency allocation to mobile terminals, whereby subcarrier frequencies of the OFDM time-frequency grid are gathered in frequency patterns, wherein
   the frequency patterns are constructed to accommodate the use of pilot subgrids,
   a set of frequency patterns is changed in a pilot compatible manner between frequency diverse and frequency selective frequency patterns,
   and said frequency patterns are allocated to mobile terminals for data transmission, a base transceiver station comprising means for distributing data on an OFDM time-frequency grid for data transmission to mobile terminals in a mobile network allowing for coordination of interferences between different cells of the mobile network and adaptive subcarrier frequency allocation to mobile terminals, whereby subcarrier frequencies of the OFDM time-frequency grid are gathered in frequency patterns, wherein
   the frequency patterns are constructed to accommodate the use of pilot subgrids,
   a set of frequency patterns is changed in a pilot compatible manner between frequency diverse and frequency selective frequency patterns,
   that said frequency patterns are allocated to mobile terminals for data transmission, a base station controller for radio resource management in a mobile network, wherein the base station controller comprises means for allocating the frequency patterns according to claim 1 to the cells of the mobile network and a mobile network comprising mobile terminals, at least one base transceiver station comprising means for distributing data on an OFDM time-frequency grid for data transmission to mobile terminals in a mobile network allowing for coordination of interferences between different cells of the mobile network and adaptive subcarrier frequency allocation to mobile terminals, whereby subcarrier frequencies of the OFDM time-frequency grid are gathered in frequency patterns, wherein
   the frequency patterns are constructed to accommodate the use of pilot subgrids,
   a set of frequency patterns is changed in a pilot compatible manner between frequency diverse and frequency selective frequency patterns,
   that said frequency patterns are allocated to mobile terminals for data transmission and at least one base station controller for radio resource management in a mobile network, wherein the base station controller comprises means for allocating the frequency patterns according to claim 1 to the cells of the mobile network.

BACKGROUND OF THE INVENTION

OFDM air interfaces will become increasingly important e.g. for future evolutions of air interfaces in 3GPP Radio Access Networks, for Wireless Local Area Networks (WLANs) e.g. according to the IEEE 802.11a standard or for a $4^{th}$ generation air interface.

In OFDM transmission, frequency patterns are allocated to the mobile terminals. Up to now, different cells have different carrier frequencies or time-frequency patterns that are random-like, so that no interference coordination between the cells is necessary or possible.

Given the licensed bandwidth, transmission capacity from network providers e.g. for WEB surfing or video streaming has to be as high as possible for all users to serve as many subscribers as possible. Further the quality of service experienced by the user and the coverage of the service is an important property demanded by the user. So OFDM shall also work at the cell border.

A frequency re-use factor of 1 for the different cells and interference coordination shall be achieved for OFDM transmission in order to increase the utilization of the bandwidth without degradation of the quality of service caused by inter-cell interference.

In cellular systems with a frequency re-use factor of 1 the signal to interference ratio at the cell border approaches the factor 1 or 0 dB, so that no useful transmission from the base station to the mobile terminal can be kept up. Therefore in CDMA systems (CDMA=Code Division Multiple Access) soft handover was introduced using a different code from the neighboring cell in addition to the primary code from the serving cell. For packet transmission using High Speed Downlink Packet Access (HSDPA) no such solution is given reducing the coverage of HSDPA transmission to a fraction of the cell area.

In OFDM transmission, frequency patterns are allocated to a mobile terminal instead of codes in CDMA systems. In OFDM transmission, in contrast to CDMA transmission, interference can be planned and avoided. For OFDM transmission, which does not provide different scrambling codes for the different base stations, the problem at the cell border has to be solved as well. For that purpose and e.g. unsynchronized base stations frequency patterns are allocated to the users and the caused cross-cell interference can be coordinated.

Additionally, using a selective allocation of subcarrier frequencies will exploit the channel capacity by allocating to a user subcarrier frequencies, e.g. a block of adjacent subcarrier frequencies, whose corresponding signals are amplified by its channel transfer function. That means that a frequency selective frequency pattern, which is best suited for each user, shall be allocated to him to run multi-user diversity.

For the coordination of interferences, the frequency patterns have to be the same in neighbor cells while the pilot subgrid in neighbor cells shall be different to allow channel estimation also in the interference region. So these frequency patterns have to be compatible with all possible pilot subgrids, meaning that the number of pilot hits, i.e. stolen subcarrier frequencies by pilots, needs to be independent of the pilot subgrid. Further to this compatibility requirement, a change from a set of frequency diverse to a set of frequency selective frequency patterns must be possible to allow an adaptation to the changing ratio of stationary users to non-stationary users.

The object of the invention is to propose a method for distributing data on an OFDM time-frequency grid for data transmission allowing for coordination of interferences between different cells of the mobile network and frequency scheduling, i.e. adaptive subcarrier frequency allocation to mobile terminals of said mobile network.

This object is achieved by a method for distributing data on an OFDM time-frequency grid for data transmission from and to mobile terminals in a mobile network allowing for coordination of interferences between different cells of the mobile network and adaptive subcarrier frequency allocation to mobile terminals, whereby subcarrier frequencies of the OFDM time-frequency grid are gathered in frequency patterns, wherein
the frequency patterns are constructed to accommodate the use of pilot subgrids,
a set of frequency patterns is changed in a pilot compatible manner between frequency diverse and frequency selective frequency patterns,
and said frequency patterns are allocated to mobile terminals for data transmission, a base transceiver station comprising means for distributing data on an OFDM time-frequency grid for data transmission to mobile terminals in a mobile network allowing for coordination of interferences between different cells of the mobile network and adaptive subcarrier frequency allocation to mobile terminals, whereby subcarrier frequencies of the OFDM time-frequency grid are gathered in frequency patterns, wherein
the frequency patterns are constructed to accommodate the use of pilot subgrids,
a set of frequency patterns is changed in a pilot compatible manner between frequency diverse and frequency selective frequency patterns,
that said frequency patterns are allocated to mobile terminals for data transmission, a base station controller for radio resource management in a mobile network, wherein the base station controller comprises means for allocating the frequency patterns according to claim 1 to the cells of the mobile network and a mobile network comprising mobile terminals, at least one base transceiver station comprising means for distributing data on an OFDM time-frequency grid for data transmission to mobile terminals in a mobile network allowing for coordination of interferences between different cells of the mobile network and adaptive subcarrier frequency allocation to mobile terminals, whereby subcarrier frequencies of the OFDM time-frequency grid are gathered in frequency patterns, wherein
the frequency patterns are constructed to accommodate the use of pilot subgrids,
a set of frequency patterns is changed in a pilot compatible manner between frequency diverse and frequency selective frequency patterns,
that said frequency patterns are allocated to mobile terminals for data transmission
and at least one base station controller for radio resource management in a mobile network, wherein the base station controller comprises means for allocating the frequency patterns according to claim 1 to the cells of the mobile network.

In the following, the main idea of the invention will be shortly described.

It shall be assumed that N is the total number of subcarrier frequencies in the frequency band. If M is the number of subcarrier frequencies contained in each frequency pattern, J frequency patterns with J·M=N can be constructed. This number J is often a power of 2 to allow efficient signaling of the patterns allocated to a user. Distributing the subcarrier frequencies of each frequency pattern as far apart as possible to achieve maximum frequency diversity results in frequency patterns, whose subcarrier frequencies all lie J subcarriers apart. The placement of all frequency patterns resembles then a simple interleaving arrangement.

These frequency patterns have to be compatible with all pilot subgrids where every p-th subcarrier is a pilot carrier. Ideally, if the number of pilot hits in the different frequency patterns is equally distributed over all frequency patterns, there should be a maximum number of pilot hits MAX per each frequency pattern that can be calculated according to this formula:

$$MAX = ceil(M/p)$$

If the distance J of the subcarrier frequencies in each frequency pattern and the distance p of the pilot subgrid subcarrier frequencies have common prime factors, the problem occurs that some frequency patterns have a lot of pilot hits while others have none. To achieve a more equal distribution of the pilots over the frequency patterns, in some of the interleaving intervals at least one cyclic shift of the respective part of the numbered frequency patterns is performed rotating the allocation of the subcarrier frequencies to the different frequency patterns inside the interleaving interval. This procedure will be described below in more detail.

The main idea of the invention is now to select M frequency patterns with (again) adjacent subcarrier frequencies. Then, in all M interleaving intervals, the M subcarrier frequencies are lined up and now, by uniting the M subcarrier frequencies of an interleaving interval, a new frequency selective frequency pattern is created. This is done in each interleaving interval. Then, the M frequency patterns with interleaved subcarrier frequencies are replaced by the M new frequency selective frequency patterns, each of them comprising just a single block of M adjacent subcarrier frequencies.

The new frequency patterns are frequency selective by just using a narrow region of the frequency spectrum. Further each new frequency pattern is also compatible with the pilot subgrid of pilot distance p since it is obvious that for any shift not more than ceil(M/p) pilots can fall in the block of width M.

Thus starting from the group of M frequency diverse frequency patterns, a new group of frequency patterns, all compatible with the pilot subgrid, can be formed containing J-M frequency diverse and M frequency selective frequency patterns. Depending on the number M, this transformation can be carried out several times starting at desired frequency positions.

With this procedure, a group of frequency patterns can be constructed that contains as well frequency diverse as frequency selective frequency patterns which are all compatible with the pilot subgrid.

The group of frequency patterns can be adapted to the traffic need, i.e. the distribution of the users on the categories stationary or non-stationary.

For the different cells of the mobile network now a fixed or negotiated power limitation on a subset of the frequency patterns is in place. The subset is different for the different cells. The non-stationary users get now allocated frequency diverse frequency patterns according to the interference sources sensed by the corresponding mobile terminals and exploiting the power limitations on interfering frequency patterns from neighbor cells. The stationary users get allocated frequency pattern also obeying the possible power limitations but they get the frequency selective frequency pattern based on their specific channel transfer function which can be signaled back.

With these frequency patterns, frequency coordination in the cell overlapping region and adaptive subcarrier allocation, i.e. frequency scheduling, is now possible at the same time.

Further developments of the invention can be gathered from the dependent claims and the following description.

BRIEF DESCRIPTION PF THE DRAWINGS

In the following the invention will be explained further making reference to the attached drawings.

FIG. 1 schematically shows the allocation of the subcarrier frequencies of an OFDM frequency grid to data and pilots for two cells.

Figure 2:
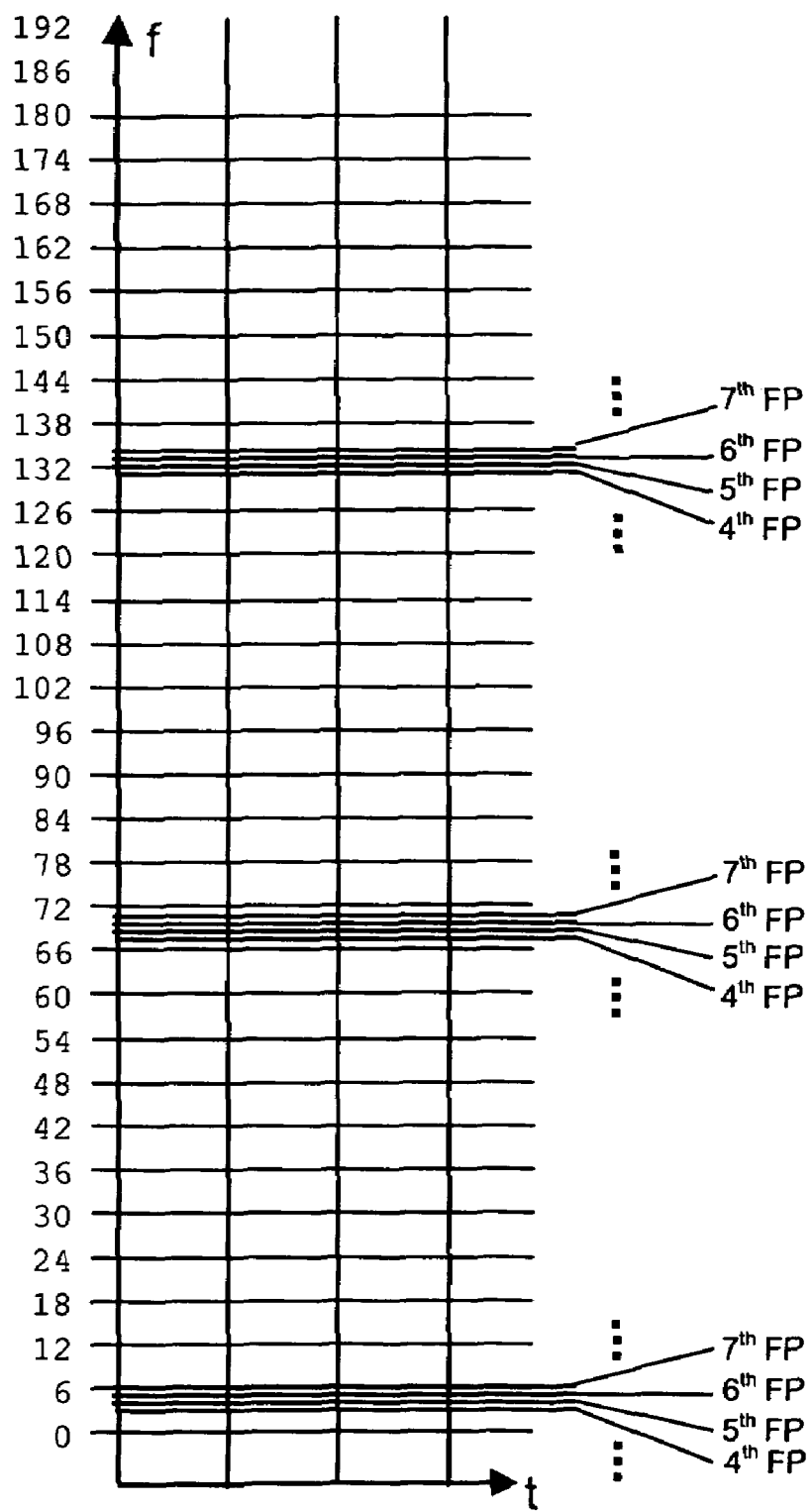

FIG. 2 schematically shows the allocation of the subcarrier frequencies of an OFDM time-frequency grid to different frequency patterns used for carrying out a method for distributing data on this OFDM time-frequency grid according to the invention.

Figure 3:
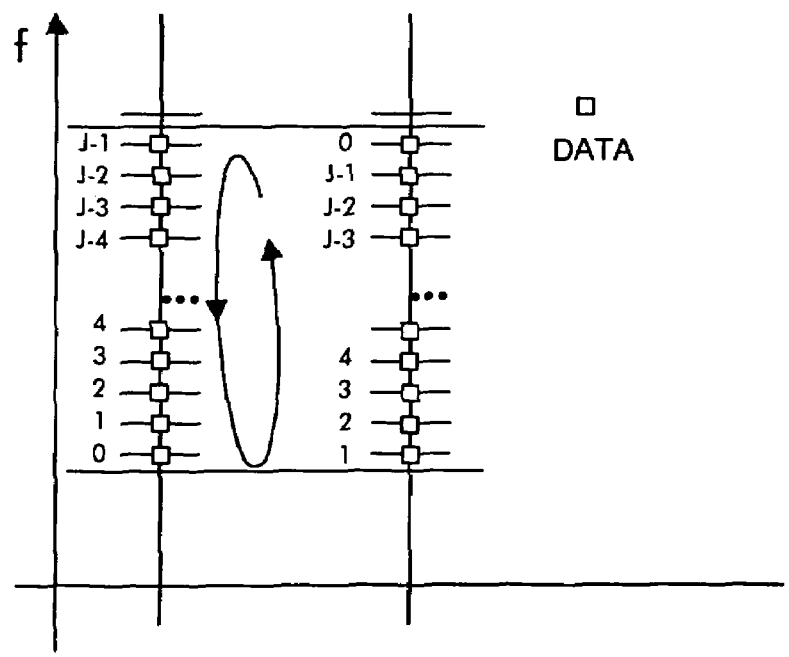

FIG. 3 schematically shows the rotation of the allocation of the subcarrier frequencies to the different frequency patterns inside one interleaving interval used for carrying out a method for distributing data on this OFDM frequency grid according to the invention.

Figure 4:
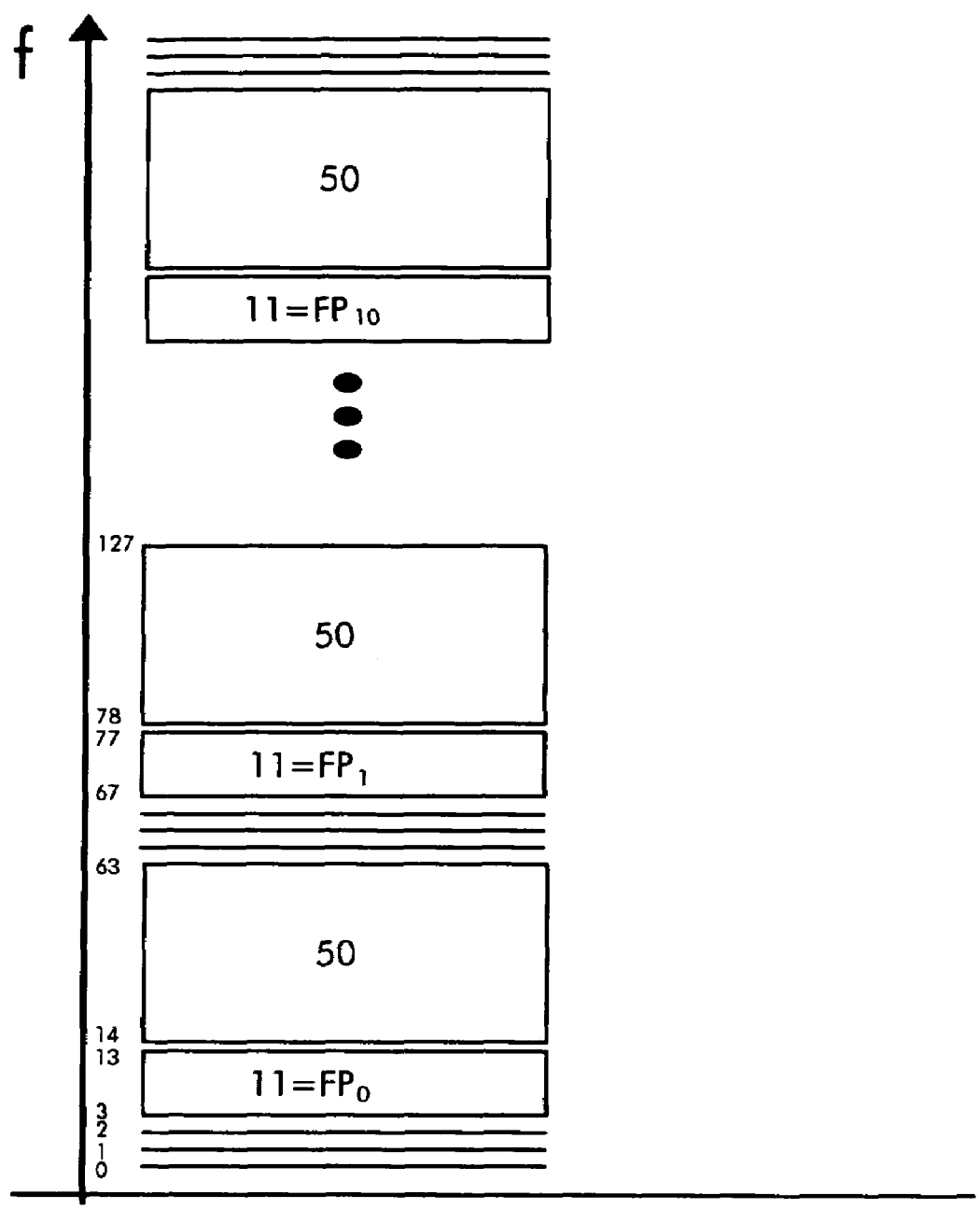

FIG. 4 schematically shows the reassembling of the subcarrier frequencies of interleaved frequency patterns of an OFDM frequency grid to new frequency patterns with adjacent subcarrier frequencies.

DETAILED DESCRIPTION OF THE INVENTION

A mobile network according to the invention comprises mobile terminals, at least one base transceiver station according to the invention and at least one base station controller according to the invention.

Each of said mobile terminals is connected to one of said at least one base transceiver stations, and each of said at least one base transceiver stations is in turn connected to one of said at least one base station controller.

The mobile terminals comprise the functionality of a mobile terminal for OFDM transmission in a mobile network, i.e. they can be connected to a mobile network by means of a base transceiver station.

A base transceiver station according to the invention comprises the functionality of a base transceiver station of a mobile network, i.e. it provides the possibility for mobile terminals to get connected to the mobile network. Furthermore, the base transceiver station comprises means for distributing data on an OFDM time-frequency grid for data transmission to different mobile terminals in a mobile network allowing for coordination of interferences between different cells of the mobile network and adaptive subcarrier frequency allocation to mobile terminals, with the subcarrier frequencies of said different frequency patterns being interleaved, with the r adjacent subcarrier frequencies of a set of r interleaved and adjacent frequency patterns being assembled to a new frequency pattern in each interleaving interval and with the new frequency patterns being allocated to different mobile terminals.

A base station controller according to the invention comprises the functionality of a base station controller of a mobile network, i.e. it controls the radio resources and performs handover procedures. Furthermore, the base station controller comprises means for allocating frequency patterns of an OFDM time-frequency grid according to the invention to the cells.

In the following, by way of example the method according to the invention is described in detail making reference to FIGS. 1 to 4.

The method according to the invention is described for an OFDM transmission for UTRAN enhancement using the physical parameter set 2 with 1024 FFT points (FFT=Fast Fourier Transformation). According to the 3GPP TR 25.892 v1 report on page 22, we then have 705 usable subcarrier frequencies to our disposition. If the DC subcarrier frequency is not used in order to avoid problems with offsets of the analog digital converter, there are 704 usable subcarrier frequencies remaining. At the same time, in a Transmission Time Interval (TTI) with a duration of 2 ms, there are 12 OFDM symbols, so that we receive a 2-dimensional field with 704*12 points in an OFDM time-frequency grid as resource. The allocation of this resource in possible time-frequency patterns shall be investigated more closely in the following.

Generally spoken, when using such time-frequency patterns together with pilot and signaling patterns in a multi-cell system, user multiplexing, channel equalization by means of pilots and signaling to the subscribers have to be assured also in the area of interference of two cells.

The requirement to provide channel equalization by means of the pilots also in the area of interference of two cells leads to the solution, that the pilots must be allocated to different points in the OFDM time-frequency grid for neighboring cells. As pilots have a higher energy than data signals, an equalization is possible even in case of interference between a pilot and a data signal.

If the base transceiver stations within the mobile network are sending in a synchronized manner, then a lot of time-frequency patterns are possible also offering advantages for user multiplexing. However, as synchronization is not provided in the UTRAN standard, there is no use in requiring this feature for OFDM transmission, so that the proposed solution is suitable for unsynchronized base transceiver stations.

To perform user multiplexing, per user, i.e. per mobile terminal, or per data channel a time-frequency pattern is defined out of the remaining resources, so that the various time-frequency patterns are disjoint subsets of the OFDM time-frequency grid. Also in this case, the interferences from different cells have to be taken into account.

In principle, it has to be distinguished, whether spreading of the interferences from one data channel to a multitude of channels in the neighboring cell has to be achieved, or whether a concentration of the interferences to only a small number of channels in the neighboring cell is desired. In case of a desired concentration of the interferences at least for a part of the time-frequency patterns, the pilots of the neighboring cells must be different, but the time-frequency patterns must be the same in the neighboring cells, so that a coordination is possible.

The density in frequency and time of the pilots must be high enough to perform a channel estimation for all channels. Furthermore, the pilot and signaling patterns must fit with the time-frequency patterns, so that the data rate is as high as required and at the same time, there are enough pilot and signaling symbols to signal the user allocation of the time-frequency pattern.

The last criteria for building time-frequency patterns is the requirement that the time-frequency patterns either have to offer frequency diversity for a robust transmission, or have to be frequency selective and choosable for a channel adaptive choice, i.e. assignment of the subcarrier frequencies, and modulation in order to achieve an optimum utilization of the channel capacity e.g. in case of predictable, slowly moving users.

As the base-transceiver stations in our example are unsynchronized so that nothing can be said about the temporal relationship of the time-frequency patterns in neighboring cells, and as pilot interferences from neighboring cells have to be avoided, the pilots in neighboring cells must lie on different subcarrier frequencies even at different points in time. This means, that the time-frequency patterns of the pilots become frequency patterns, i.e. pilot subgrids in our example.

Without restricting to this, we assume in our example, that every $12^{th}$ subcarrier frequency is a pilot or alternating a pilot and a signaling carrier, which are combined for the sake of simplicity in the following and both called pilots. These pilots have an effective frequency distance of 12 in the grid of subcarrier frequencies and there are about as much pilot carriers as signaling carriers.

The numbering of the subcarrier frequencies for the allocation to the different frequency patterns is done in such a way, that the DC subcarrier is not used for the above mentioned reasons and that the remaining 704 usable subcarrier frequencies are numbered from 0 to 703, which leads to a higher frequency distance between the subcarrier frequencies 351 and 352. This means, that the distance of the pilots around the DC subcarrier is somewhat larger, which is however acceptable for channel estimation. As a result, we get 12 pilot subgrids characterized by the position of the lowest pilot subcarrier frequency which lies between 0 and Having found the possible pilot subgrids, we can deduce out of the general requirements mentioned above conditions for the user multiplexing patterns, i.e. the different time-frequency patterns.

With a pilot distance of 12, there are either 59 or 58 pilots per OFDM symbol, so that a minimum of 645 usable subcarrier frequencies remain. 640 subcarrier frequencies offer a capacity of 12*640=7680 QAM symbols (QAM=Quadrature Amplitude Modulation). As a code in CDMA systems with a spreading factor of 16 has a capacity of 480 QAM symbols in a TTI interval of 2ms, 16 codes with a spreading factor of 16 can be accommodated. The capacity of a time-frequency pattern corresponding to a code with a spreading factor of 16 is therefore 640/16=40 subcarrier frequencies per OFDM symbol.

To achieve the aim of interference spreading from one data channel to a multitude of channels in the neighboring cell, one could use together with shifted pilot subgrids also shifted user multiplexing patterns in different cells. However, as we want to achieve concentration of the interferences at least for a part of the time-frequency patterns, i.e. the user multiplexing patterns, these time-frequency patterns must be the same in the neighboring cells, so that a coordination is possible. In this case an interference spreading can nevertheless be achieved by putting these time-frequency patterns in different cells differently together to get new time-frequency patterns.

In principle, to achieve concentration of the interferences, the user multiplexing patterns can not be time-dependent, as the base transceiver stations are not synchronized, so that the identity of time-dependent user multiplexing patterns in different cells can not be guaranteed. That means, that the time-frequency patterns become simple frequency patterns that are used throughout a whole TTI interval.

As already mentioned, to achieve concentration of the interferences, the frequency patterns in neighboring cells must be the same although the pilot subgrids being different. This means, that each frequency pattern must comprise so many subcarrier frequencies, that after subtraction of the pilots that lie within the frequency patterns, enough subcarrier frequencies remain to allow for data transmission with the required data rate.

In FIG. 1, the OFDM frequency grid for two neighboring cells CELL1 and CELL2 is depicted along the frequency axis f. The position of the subcarrier frequencies in the OFDM frequency grid is indicated by short equidistant lines. Subcarrier frequencies that are indicated with circles signify, that they are used for pilots, i.e. they can not be used for data transmission. Subcarrier frequencies that are indicated with rectangles are used for data transmission. The subcarrier frequencies within the dotted frame belong to the same frequency pattern, i.e. to the same user multiplexing pattern. As can be seen, this frequency pattern is the same for both cells as required above, but the pilot subcarrier frequencies are different.

As the subcarrier frequencies that are used for pilots can not be used for data transmission, there must remain enough subcarrier frequencies for data transmission for every position of the pilot subgrid in the frequency grid.

As a consequence, frequency patterns have to be found, that fit together with the pilot subgrid having a pilot distance of 12 and that allow for concentration of interferences.

In the example, without restriction, the frequency patterns shall provide the capacity to transport 120 QAM symbols in a TTI interval and each frequency pattern shall possess frequency diversity. That means, that every frequency pattern comprises 11 subcarrier frequencies that must be distributed as equally as possible over the OFDM frequency grid. The easiest way to achieve this, is to arrange the 11 subcarrier frequencies of a frequency pattern with a distance of 64 in the OFDM frequency grid, so that 64 comb-like interleaved frequency patterns are received that cover the whole OFDM frequency grid of usable subcarrier frequencies, as 64*11=704.

In FIG. 2, the above mentioned frequency patterns are shown. The OFDM frequency grid is depicted along the frequency axis f, and the position of the subcarrier frequencies in the OFDM frequency grid is indicated by numbers. The periodically returning position along the frequency axis of the subcarrier frequencies of the $4^{th}$ to $7^{th}$ frequency pattern $4^{th}$ FP to $7^{th}$ FP is depicted for the first three interleaving intervals. The first subcarrier frequency of the first frequency pattern lies at the position 0, the second subcarrier frequency of the first frequency pattern lies at the position 64 and so on. The first subcarrier frequency of the second frequency pattern lies at the position 1, the second subcarrier frequency of the second frequency pattern lies at the position 65 and so on. The requirement of compatibility with the pilot subgrid means, that in each frequency pattern, at most one pilot is allowed, so that at least 10 subcarrier frequencies remain for data transmission of 10*12=120 QAM symbols in a TTI interval. However, this requirement is in contrast with the above described simple arrangement, as already the first frequency pattern has three pilots and is therefore useless.

Thus, the frequency patterns have to be modified to meet this requirement. This is done by means of a cyclic shift of the frequency patterns from the $3^{rd}$ interleaving interval on, by means of two cyclic shifts of the frequency patterns from the $6^{th}$ interleaving interval on and by means of three cyclic shifts of the frequency patterns from the 9th inter-leaving interval on.

In FIG. 3, the allocation of the subcarrier frequencies to the frequency patterns before and after such a cyclic shift is shown. The OFDM frequency grid is depicted along the frequency axis f, and the position of the subcarrier frequencies in the OFDM frequency grid are indicated by rectangles. The different frequency patterns are numbered from 0 to J-1, which is in our example 63. On the left side, the interleaving interval before a cyclic shift is depicted. The number of the frequency pattern is increasing from 0 to J-1, which is 63, with increasing frequency. On the right side, the allocation of the subcarrier frequencies to the frequency patterns after such a cyclic shift is shown. The lowest subcarrier frequency is now allocated to the frequency pattern indicated with 1, the second-lowest subcarrier frequency is now allocated to the frequency pattern indicated with 2 and so on. The highest subcarrier frequency of the interleaving interval is now allocated to the frequency pattern indicated with 0.

For every pilot subgrid with a distance of 12 in the frequency grid, all frequency patterns have at most 1 pilot among the 11 subcarrier frequencies as will be shown in the following.

Every frequency pattern A is described by its subcarrier frequency positions K, i.e. by the set $K=\{k_0, \ldots, k_{10}\}$. It is characterized uniquely by the starting position of the first subcarrier frequency $k_0 \in \{0, \ldots, 63\}$. Thus, a frequency pattern can be indicated by $A(k_0)$. If n is the number of the interleaving interval, with $n \in \{0, 1, 2, \ldots, 10\}$, then the subcarrier frequency positions $A(k_0)$ are given by the following formula:

$$k_n = n \cdot 64 + \left\{ \begin{array}{l} k_0 - \left\lfloor \frac{n+1}{3} \right\rfloor \\ 64 + k_0 - \left\lfloor \frac{n+1}{3} \right\rfloor \text{ if } k_0 - \left\lfloor \frac{n+1}{3} \right\rfloor < 0 \end{array} \right\}$$

To find out whether pilots lie in the frequency pattern, the subcarrier frequency positions have to be calculated modulo 12. This value indicates, how far the periodic pilot subgrid has to be shifted from the origin to have the pilot lying on the subcarrier frequency position. From this follows, that all subcarrier frequency positions modulo 12 shall be spreaded over the range 0 to 11 and no value shall appear two times. Otherwise, a shift of the pilot subgrid would lead to two or more pilots lying in one frequency pattern. On the other hand, if each value appears only once, it is shown that every shift of the pilot subgrid leads to at most one pilot lying in one frequency pattern, which is the required attribute.

Thus, the modulo operation for the subcarrier frequency positions is performed. As can be received from the formula for the subcarrier frequency positions for the starting position $k_0=0$, the subcarrier frequency positions $k_0$ to $k_{10}$ are (0, 64, 191, 255, 319, 382, 446, 510, 573, 637, 701). To obtain the modulo values, the modulo operation can be distributed to the summands:

$$k_n \mathrm{mod} 12 = \left( n \cdot 4 + k_0 \mathrm{mod} 12 + \left\{ \begin{array}{l} \left(-\left\lfloor \frac{n+1}{3} \right\rfloor\right) \mathrm{mod} 12 \\ 4 + \left(-\left\lfloor \frac{n+1}{3} \right\rfloor\right) \mathrm{mod} 12 \text{ if } k_0 - \left\lfloor \frac{n+1}{3} \right\rfloor < 0 \end{array} \right\} \right) \mathrm{mod} 12$$

Thus we receive $k_n \mathrm{mod} 12 = (0, 4, 11, 3, 7, 10, 2, 6, 9, 1, 5)$.

For $k_0=0$ the value 8 does not appear and every other value appears only once. That means that there is at most one pilot in the first frequency pattern. Now, this modulo operation has to be performed for the other frequency patterns.

For $k_0=1$, we receive $k_n=(1, 65, 128, 192, 256, 383, 447, 511, 574, 638, 702)$ and $k_n \mathrm{mod} 12=(1, 5, 8, 0, 4, 11, 3, 7, 10, 2, 6)$.

For $k_0=2$, we receive $k_n=(2, 66, 129, 193, 257, 320, 384, 448, 575, 639, 703)$ and $k_n \mathrm{mod} 12=(2, 6, 9, 1, 5, 8, 0, 4, 11, 3, 7)$.

Also in these cases, at most one pilot is in the frequency patterns, as can be seen from the values.

For $k_0=3$ and higher values of $k_0$, in the formula for the calculation of the subcarrier frequency positions, the exceptional case does not appear any more, and these positions are determined in the following way:

$$k_n = k_0 + n \cdot 64 - \left\lfloor \frac{n+1}{3} \right\rfloor \text{ for } k_0 \geq 3.$$

All frequency patterns are then received by means of a simple frequency shift as given by the starting position of the first subcarrier frequency $k_0$. As the number of pilots does not depend upon shifts, it is sufficient to check the first representative frequency pattern for $k_0=3$. For $k_0=3$, we receive $k_n=(3, 67, 130, 194, 258, 321, 385, 449, 512, 576, 640)$ and $k_n \mathrm{mod} 12$ (3, 7, 10, 2, 6, 9, 1, 5, 8, 0, 4).

Also in this case, at most one pilot is in the frequency patterns, and thus, this is also the case for all shifted frequency patterns with $4 \leq k_0 \leq 63$.

In consequence, it has been shown that in all frequency patterns, there is at most one pilot, so that the requirement of compatibility with the pilot subgrid mentioned above is given.

Each single one of these frequency patterns offers frequency diversity, and the frequency patterns can be the same in all cells.

The above mentioned procedure to receive frequency patterns can be applied for various periodicities of the pilot subgrid, for various periodicities of the interleaving interval, i.e. for various numbers of frequency patterns, for various maximum numbers of pilots that are allowed in a frequency pattern and for various bandwidths of the frequency grid. In other words, in at least one interleaving interval, at least one cyclic shift of the frequency patterns is performed. This is done repeatedly till no more than a maximum number of pilots lie within each frequency pattern, which is verified by the above mentioned procedure.

Of course, the above mentioned procedure of the cyclic shift must only be performed, if the number of pilots that lie within each of the interleaved frequency patterns exceeds a maximum defined number for at least one of the interleaved frequency patterns.

To achieve our aim to distribute the OFDM frequency grid variable into frequency diverse and frequency selective frequency patterns, the following reassembling of the interleaved and cyclic shifted frequency patterns is proposed. In our example, a maximum of 3 cyclic shifts is performed from the 9th interleaving interval on. From FIG. 3, we can deduce, that with a maximum of 3 cyclic shifts, all frequency patterns indicated with a number of 3, i.e. A(3), and above (so from the 4$^{th}$ frequency pattern 4$^{th}$ FP inclusive onward) have adjacent subcarrier frequencies in each interleaving interval.

In FIG. 4, a possible reassembling of interleaved frequency patterns is shown. The subcarrier frequencies are depicted along the frequency axis f and numbered on the left side. In our example, the subcarrier frequencies of the frequency patterns A(3) to A(13), that are adjacent in each interleaving interval, are assembled to new frequency patterns $FP_0$ to $FP_{10}$ in each interleaving interval. In FIG. 4, this is indicated by the boxes with the indication $FP_0$ to $FP_{10}$, each of these 11 new frequency patterns comprising 11 subcarrier frequencies. The boxes indicated with the number 50 stand for the remaining frequency diverse frequency patterns A(14) to A(63).

That means, that 11 frequency diverse frequency patterns have been replaced by 11 frequency selective new frequency patterns and altogether 53 frequency diverse and 11 frequency selective frequency patterns are received.

The above mentioned procedure for replacing 11 frequency diverse frequency patterns by 11 frequency selective new frequency patterns can be performed up to 5 times. There is also some degree of freedom where to place the starting position of the new frequency selective frequency patterns. Thus either 11, 22, 33, 44 or 55 frequency selective new frequency patterns can be received. This can be used to tune the ratio of frequency diverse to frequency selective frequency patterns in steps. As frequency selective frequency patterns can be put together to achieve larger frequency diverse frequency patterns, also intermediate steps for this tuning can be achieved.

Also for the new frequency selective frequency patterns holds true, that independent of the position of the pilot subgrid, at most 1 pilot lies in each new frequency selective frequency pattern, which is a requirement for usage in our example.

Generally, depending on the number of cyclic shifts that have been performed, an arbitrary number of adjacent subcarrier frequencies in each interleaving interval can be assembled to new frequency patterns.

In another embodiment, the mentioned procedure is also not restricted to frequency patterns that comprise single subcarrier frequencies in each interleaving interval. A frequency pattern can also comprise Q blocks of L (e.g. L=2 or L=3) adjacent subcarrier frequencies where the blocks of the frequency patterns lie interleaved as in FIG. 2. Then the same principles of rotating the allocation in at least one interleaving interval and assembling adjacent blocks to bigger frequency selective blocks can be applied.

A base transceiver station according to the invention allocates these frequency patterns to different mobile terminals for communication with these mobile terminals, i.e. for distributing data on the OFDM time-frequency grid.

In a preferred embodiment, a base station controller according to the invention allocates the frequency patterns to the cells of the mobile network.

The invention claimed is:

1. A method for distributing data on an OFDM time-frequency grid for data transmission from and to mobile terminals in a mobile network allowing for coordination of interferences between different cells of the mobile network and adaptive subcarrier frequency allocation to mobile terminals, comprising:
    gathering subcarrier frequencies of the OFDM time-frequency grid in frequency patterns;
    constructing the frequency patterns to accommodate the use of pilot subgrids;
    changing a set of frequency patterns in a pilot-compatible manner between frequency diverse and frequency selective frequency patterns;
    allocating the frequency patterns to mobile terminals for data transmission;
    wherein a number of cyclic shifts in each of a plurality of interleaving intervals is chosen so that a number of pilots within each of a plurality of frequency diverse frequency patterns is not larger than the smallest integer that is larger than or equal to the result of the division of a number of subcarrier frequencies contained in each of the frequency diverse frequency patterns by a number of steps that lie between two adjacent pilots in an OFDM time-frequency grid.

2. A method according to claim 1, wherein the subcarrier frequencies of different frequency patterns are interleaved and thereby form the plurality of frequency diverse frequency patterns, for a set of r interleaved and adjacent frequency diverse frequency patterns, wherein the adjacent subcarrier frequencies in each interleaving interval are assembled into a frequency selective frequency pattern.

3. A method according to claim 2, wherein in order to accommodate the use of pilot subgrids suitable for channel estimation, before assembling the adjacent subcarrier frequencies, in at least one interleaving interval, as many cyclic shifts of the respective part of the frequency diverse frequency patterns are performed, rotating the allocation of the subcarrier frequencies to the different frequency diverse frequency patterns, as must be performed in order to achieve that the distribution of the pilot subgrids over the frequency diverse frequency patterns leads for each pilot subgrid to no more than a maximum defined number of pilots that lie within each frequency diverse frequency pattern.

4. A base transceiver station comprising:
    means for distributing data on an OFDM time-frequency grid for data transmission to mobile terminals in a mobile network allowing for coordination of interferences between different cells of the mobile network and adaptive subcarrier frequency allocation to mobile terminals;
    wherein subcarrier frequencies of the OFDM time-frequency grid are gathered in frequency patterns;
    wherein the frequency patterns are constructed to accommodate the use of pilot subgrids;
    wherein a set of frequency patterns is changed in a pilot-compatible manner between frequency diverse and frequency selective frequency patterns; and
    further comprising means for allocating frequency patterns to mobile terminals for data transmission;
    wherein a number of cyclic shifts in each of a plurality of interleaving intervals is chosen so that a number of pilots within each of a plurality of frequency diverse frequency patterns is not larger than the smallest integer that is larger than or equal to the result of the division of a number of subcarrier frequencies contained in each of the frequency diverse frequency patterns by a number of steps that lie between two adjacent pilots in an OFDM time-frequency grid.

5. A base transceiver station comprising:

means for distributing data on an OFDM time-frequency grid for data transmission to mobile terminals in a mobile network allowing for coordination of interferences between different cells of the mobile network and adaptive subcarrier frequency allocation to mobile terminals, wherein the means for distributing data:

gathers subcarrier frequencies of the OFDM time-frequency grid in frequency patterns;
constructs the frequency patterns to accommodate the use of pilot subgrids; and changes a set of frequency patterns in a pilot compatible manner between frequency diverse and frequency selective frequency patterns that said frequency patterns are allocated to mobile terminals for data transmission; and means for adaptively allocating subcarrier frequency to mobile terminals, wherein the means for allocating allocates the frequency patterns to mobile terminals for data transmission;

wherein a number of cyclic shifts in each of a plurality of interleaving intervals is chosen so that a number of pilots within each of a plurality of frequency diverse frequency patterns is not larger than the smallest integer that is larger than or equal to the result of the division of a number of subcarrier frequencies contained in each of the frequency diverse frequency patterns by a number of steps that lie between two adjacent pilots in an OFDM time-frequency grid; and wherein the subcarrier frequencies of different frequency patterns are interleaved and thereby form the plurality of frequency diverse frequency patterns, for a set of r interleaved and adjacent frequency diverse frequency patterns, wherein the adjacent subcarrier frequencies in each interleaving interval are assembled into a frequency selective frequency pattern.

6. A base station controller for radio resource management in a mobile network, wherein the base station controller comprises:

means for distributing data on an OFDM time-frequency grid for data transmission to mobile terminals in a mobile network allowing for coordination of interferences between different cells of the mobile network and adaptive subcarrier frequency allocation to mobile terminals, wherein the means for distributing:

gathers subcarrier frequencies of the OFDM time-frequency grid in frequency patterns;
constructs the frequency patterns to accommodate the use of pilot subgrids; and
changes a set of frequency patterns in a pilot-compatible manner between frequency diverse and frequency selective frequency patterns; and means for allocating the frequency patterns to the cells of the mobile network, wherein the means for allocating the frequency patterns allocates the frequency patterns to mobile terminals for data transmission;

wherein a number of cyclic shifts in each of a plurality of interleaving intervals is chosen so that a number of pilots within each of a plurality of frequency diverse frequency patterns is not larger than the smallest integer that is larger than or equal to the result of the division of a number of subcarrier frequencies contained in each of the frequency diverse frequency patterns by a number of steps that lie between two adjacent pilots in an OFDM time-frequency grid.

7. A mobile network comprising mobile terminals, at least one base transceiver station comprising means for distributing data on an OFDM time-frequency grid for data transmission to mobile terminals in a mobile network allowing for coordination of interferences between different cells of the mobile network and adaptive subcarrier frequency allocation to mobile terminals, wherein the means for distributing data:

gathers subcarrier frequencies of the OFDM time-frequency grid in frequency patterns;
constructs the frequency patterns to accommodate the use of pilot subgrids; and
changes a set of frequency patterns in a pilot compatible manner between frequency diverse and frequency selective frequency patterns that said frequency patterns are allocated to mobile terminals for data transmission; and means for adaptively allocating subcarrier frequency to mobile terminals, wherein the means for allocating allocates the frequency patterns to mobile terminals for data transmission;

wherein a number of cyclic shifts in each of a plurality of interleaving intervals is chosen so that a number of pilots within each of a plurality of frequency diverse frequency patterns is not larger than the smallest integer that is larger than or equal to the result of the division of a number of subcarrier frequencies contained in each of the frequency diverse frequency patterns by a number of steps that lie between two adjacent pilots in an OFDM time-frequency grid.

* * * * *

UNITED STATES PATENT AND TRADEMARK OFFICE
CERTIFICATE OF CORRECTION

PATENT NO. : 7,596,080 B2  Page 1 of 1
APPLICATION NO. : 11/356370
DATED : September 29, 2009
INVENTOR(S) : Christian Georg Gerlach It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 812 days.

Signed and Sealed this

Twenty-eighth Day of September, 2010

David J. Kappos
*Director of the United States Patent and Trademark Office*